UNITED STATES PATENT OFFICE.

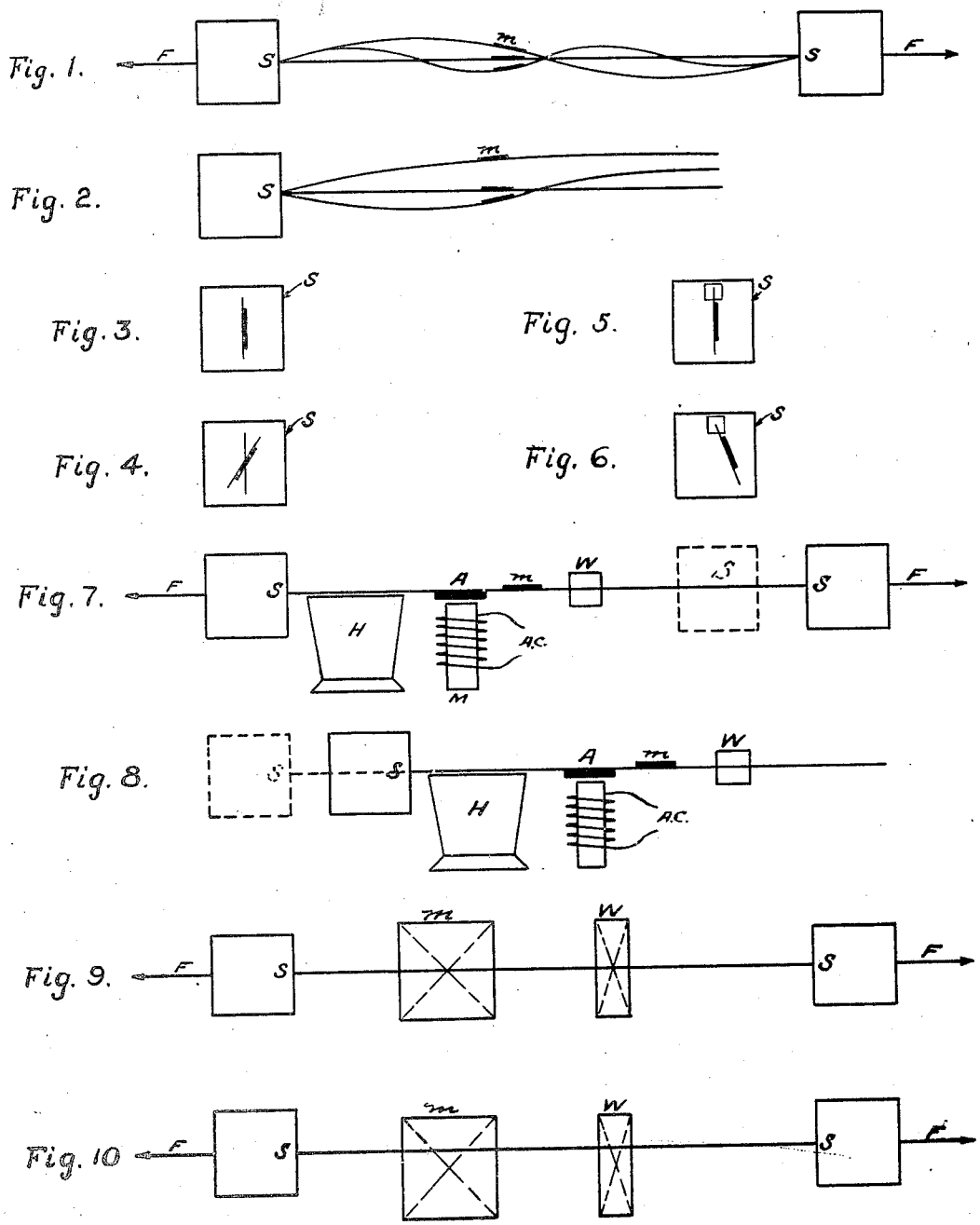

WYNANT J. WILLIAMS, OF ALBANY, AND HARALD HENRI RASMUSSEN, OF TROY, NEW YORK.

PHONOPHOTOSCOPE.

1,037,530.    Specification of Letters Patent.    Patented Sept. 3, 1912.

Application filed July 15, 1911. Serial No. 638,781.

*To all whom it may concern:*

Be it known that we, WYNANT J. WILLIAMS, a citizen of Great Britain, residing at Albany, in the county of Albany and State of New York, and HARALD HENRI RASMUSSEN, a citizen of the Kingdom of Denmark, residing in the city of Troy, county of Rensselaer, and State of New York, have invented certain new and useful Improvements in Phonophotoscopes, of which the following is a specification.

Our invention relates to a scientific toy for forming light figures on a shaded surface.

The objects of our invention are to provide a method for constructing a scientific toy which can be easily operated and made to produce results which are both interesting and instructive.

The objects are attained by a toy constructed as shown in the following drawings in which—

Figures 1 and 2 are longitudinal sections. Figs. 3, 4, 5 and 6 are cross-sections. Figs. 7 and 8 are longitudinal sections showing different means of producing vibration. Figs. 9 and 10 are longitudinal sections showing variations in the use of the toy.

Similar letters refer to similar parts through the several views.

The toy is used to produce light figures by reflecting a beam of light upon a shaded surface. It is so constructed that vibrations, such as those produced by sound waves, generate in the vibrating system, vibrations in two directions. A reflector, such as a glass mirror, is attached to and forms a part of the vibrating system and is thus made to partake of the motion of each vibration simultaneously. Light from the sun or some artificial source is allowed to fall upon the mirror from which it is reflected to the surface which is shaded from the direct rays of light from the source. As the mirror moves the reflected pencil of light traces on the shaded surface intricate figures which appear to the observer to be complete pictures since the frequency of the vibrations is so great that it is impossible for the eye to follow the motion of the spot of light from point to point. In order that the same apparatus can be used to produce a large number of these light figures, means are provided for changing the period, amplitude and phase of one vibration with respect to the period, amplitude and phase of the other vibration in such a manner that the resultant motion of the mirror is under the control of the operator. The method of obtaining these results can best be understood by reference to the accompanying drawings.

Fig. 1 shows a membrane supported at each end and free to vibrate as a vibrating string fastened at each end. m is a mirror attached to the membrane and free to vibrate. The figure shows three of the many positions the mirror may take while the membrane is in vibration. Fig. 2 shows a membrane free to vibrate as a vibrating reed. This figure also shows three of the many positions the mirror m attached to the membrane may take while in vibration. S represents supports for the membrane and F represents the tension. These two figures show how the vibration in one direction is obtained. It is evident from these figures that the mirror while continuing to remain parallel to the membrane must tend to turn about an axis perpendicular to the paper in said figures. Different methods of producing this vibration are shown in Figs. 7 and 8. H represents a tube into which the operator introduces a sound wave. The membrane being in the vicinity of the sound wave will be set in and maintained in vibration by it. M represents an electro-magnet supplied with an alternating or varying current of electricity. The alternating or varying current produces a varying magnetic flux in the core of the magnet which in turn produces a varying pull on its armature A. This armature A is attached to the membrane so that the motion of A is communicated to the membrane which is thus set in and maintained in vibration.

Any method such as the two described may be used for exciting the vibrating system so long as the period of vibration imparted to the system is of the same order of magnitude as the periods of sound waves. It is best to maintain the amplitude of the vibration practically constant as this will produce the most distinct figures.

The method of producing the second vibration is shown in Figs. 3, 4, 5 and 6 which are cross-sections through the mirror and membrane as shown in Figs. 1 and 2. This method depends upon the principle that every vibrating system has what is technically known as its free period of vibration and when disturbed will always vibrate with this period unless forced to execute some other motion. The vibrating system producing motion about the axis parallel to the paper, as shown in Figs. 1 and 2, differs from the system which produces the motion about the axis perpendicular to the paper, as shown in said figures. Therefore, each system may have its own critical period which may be very different from that of the other as also the amplitude and phase of one system may be different from the other, although the energy which produces the two vibrations is derived from the same source. In order to start this second vibration, therefore, it is only necessary that the motion given to the second vibrating system by the motion of the first vibrating system shall not be transferred to this second system through its center of resisting moments. In order to make this point clear we take the case of a mirror supported at its center of mass to a vibrating string, as shown in Fig. 9. Now since it is impossible to impart a rotary motion to a body by impressing upon it a linear force through its center of mass it follows that the to and fro motion of the point of the string attached to the mirror will produce only a to and fro linear motion of the mirror. On the other hand, if a linear force is applied to a body at any point other than its center of mass the force will give the body a rotary as well as a linear motion. Then in Fig. 10, where the string is attached to a point above the center of mass of the mirror, the mirror will be given a rotary motion about an axis parallel to the string as well as the to and fro motion of the string. Thus we see that if the mirror is attached to the string at two or more points the mirror will tend to become tangent to the string through these points giving us a rotary vibration about one axis and that if the motion of the string is imparted to the mirror through any other point than its center of mass the mirror will be given a vibrating motion of rotation about another axis and it is the resultant of these two motions that give the required motion to the mirror.

The small vibrating string used in the above explanation may be replaced by a vibrating member of any kind provided one or both ends are fastened in such a manner as to prevent a rotation at the support of the member about its axis. By this means when the vibrating member, including the mirror, tends to rotate about an axis parallel to the membrane at rest this rotation is resisted by the elasticity of the membrane about this axis which results in the tendency to rotate being transformed into a rotary vibratory motion like that of a torsion pendulum as illustrated by Figs. 3 and 4 in which the rotary vibration takes place about an axis perpendicular to the plane of the paper in said figures.

Figs. 5 and 6 show how the torsion pendulum effect may be produced by holding the vibrating member firmly for a short distance along its length as at one side only, the vibration taking place about this side as an axis.

To explain the method used to change the period, amplitude and phase of the one vibration with respect to the same properties of the other vibration, assume that the air column in H is vibrating and that the vibrating system, including the mirror, is so adjusted that there is no tendency for the system to vibrate as a torsion pendulum. Under these conditions the vibrating air column will set the system in vibration. The character of this vibration, if the system is constructed similar to that shown in Figs. 1, 7 and 9, can be modified by changing the distance between the supports, that is the free length of the vibrating member, the tension F applied to the membrane or by changing the mass or distribution of the mass of the vibrating member. The dotted support S, Fig 7, shows how the length may be altered while the movable mass W in Fig. 9 shows how the mass or its distribution may be altered. If the system is similar to that shown in Figs. 2 and 8, the character of the vibration may be altered by changing the length of the vibrating member as shown by the dotted support in Fig. 8 or by changing the mass or distribution of the mass as shown by the movable mass W in Fig. 8. These figures also show how the amplitude of the vibration executed by the mirror will depend upon the position of the mirror along the length of the vibrating membrane. Also if the mass of the vibrating system is not symmetrically located throughout the length of the vibrating membrane as shown in Fig. 10 the to and fro motion of the air not only produces a to and fro motion of the membrane but also a motion of rotation about an axis parallel to the length of the membrane. Since the membrane has the properties of a torsion pendulum this rotary motion will tend to set the membrane in a rotary vibration with a period equal to its own free period of vibration. If the free period of vibration of the membrane considered as a torsion pendulum has such a relation to the impulses received from the transverse vibrations of the system considered as a vibrating string that the rotary vibration cannot be maintained by the principle of resonance any of the adjustments already described may be made until the properties of each system are such that this vibration will be maintained by resonance from the transverse impulses. It is thus possible to produce both a transverse and rotary vibration of the same membrane, the periods of the two vibrations being equal or the period of one a multiple of the other.

We have found by experiment that any of the adjustments described for producing the desired periods can also be used to produce any desired change in the relation between the phase or amplitude of the two vibrations. Any adjustment made to change the character of either vibration will also change the character of the other but not by an equal amount. For instance, if the mirror or mass W in Fig. 10 is moved at right angles to the string the character of the transverse vibration will be affected since the effective inertia of the vibrating string has been changed and the character of the rotary vibration has been affected since the moment of inertia of the torsion pendulum has been changed but in general the change produced by changing the inertia of the vibrating string will not be of the same magnitude as the change produced by changing the moment of inertia of the torsion pendulum and it is this differential effect that produces the desired adjustment. By thus adjusting the character of the two vibrations it is possible for any one to produce all the well known Lissajous figures.

Having thus described our invention, what we claim as new and desire to protect by Letters Patent, is—

1. In a toy, a vibrating member secured between two supports, a reflector mounted upon said vibrating member, means for vibrating said member carrying said reflector transversely as a string fastened at each end and at the same time means for vibrating said reflector in a rotary direction as a torsion pendulum.

2. A toy consisting of a vibrating member supported at each end, a mirror attached to said vibrating member, means for giving said mirror a rotary vibration upon one axis produced by transverse vibration like that of a vibrating string and means at the same time for giving said mirror a rotary vibration around another axis produced by a rotary vibration like that of a torsion pendulum.

3. A toy consisting of a vibrating member supported at each end, a mirror mounted upon said vibrating member, means for giving said mirror a rotary vibration upon one axis produced by transverse vibration like that of a vibrating string and means at the same time for giving said mirror a rotary vibration around another axis produced by a rotary vibration like that of a torsion pendulum, and means for changing the period, amplitude and phase of the rotary vibration of said mirror produced by a transverse vibration of said member with respect to the period, amplitude and phase of the rotary vibration of said mirror produced by the rotary vibration of the member when said mirror is executing both vibrations simultaneously.

In testimony whereof we affix out signatures in presence of two witnesses.

WYNANT J. WILLIAMS.
HARALD HENRI RASMUSSEN.

Witnesses:
  WALTER E. WARD,
  J. W. BURROWS.